United States Patent [19]

Toyoda et al.

[11] Patent Number: 5,035,495
[45] Date of Patent: Jul. 30, 1991

[54] OPTICAL UNIT INCLUDING A SUBSTRATE AND OPTICAL ELEMENT SUPPORTED ON THE SUBSTRATE SUCH THAT THERMAL STRESSES ARE PREVENTED FROM BEING EXERTED ON THE OPTICAL ELEMENT

[75] Inventors: Shuhei Toyoda, Nagoya; Syunzo Mase, Tobishima; Masami Matsuura, Aichi; Shogo Kawaguchi, Nagoya, all of Japan

[73] Assignee: NGK Insulators, Ltd., Nagoya, Japan

[21] Appl. No.: 494,817

[22] Filed: Mar. 15, 1990

Related U.S. Application Data

[63] Continuation of Ser. No. 159,735, Feb. 24, 1988, abandoned.

[30] Foreign Application Priority Data

Feb. 27, 1987 [JP] Japan .................... 62-46369
Feb. 27, 1987 [JP] Japan .................... 62-46370

[51] Int. Cl.⁵ .................... G02F 1/03; G02F 1/09; G02B 7/192
[52] U.S. Cl. .................... 350/588; 350/374; 350/387; 350/609
[58] Field of Search .............. 350/374, 375, 376, 392, 350/393, 339 R, 356, 357, 387, 588, 609

[56] References Cited

U.S. PATENT DOCUMENTS

| | | | |
|---|---|---|---|
| 4,379,620 | 4/1983 | Erickson | 350/387 |
| 4,491,393 | 1/1985 | Roelants | 350/392 |
| 4,533,217 | 8/1985 | Samek | 350/392 |
| 4,556,288 | 12/1985 | Sekimura | 350/339 R |
| 4,569,573 | 2/1986 | Agostinelli | 350/356 |
| 4,634,624 | 1/1987 | Tajima et al. | 428/212 |
| 4,641,924 | 2/1987 | Nagae et al. | 350/339 R |
| 4,688,909 | 8/1987 | Smith | 350/631 |

Primary Examiner—Bruce Y. Arnold
Assistant Examiner—Martin Lerner
Attorney, Agent, or Firm—Parkhurst, Wendel & Rossi

[57] ABSTRACT

An optical unit as used for an optical sensor, including a substrate, one or more optical elements fixedly supported by the substrate, and an protecting arrangement associated with the substrate and at least one of the optical elements, for protecting each associated optical element from thermal stresses exerted thereto due to a difference in thermal expansion coefficient between the substrate and the associated optical element. The protecting arrangement may consist of at least one intermediate body interposed between the substrate and the associated optical element. Each intermediate body has a thermal expansion coefficient close to that of the associated optical element. Alternatively, the protecting arrangement may consist of a constricted protecting portion such as protrusions or slots formed on one of the associated optical elements and the substrate, such that the protecting portion defines an adjoining interface between the optical element and the substrate, or is located adjacent to the adjoining interface.

10 Claims, 7 Drawing Sheets

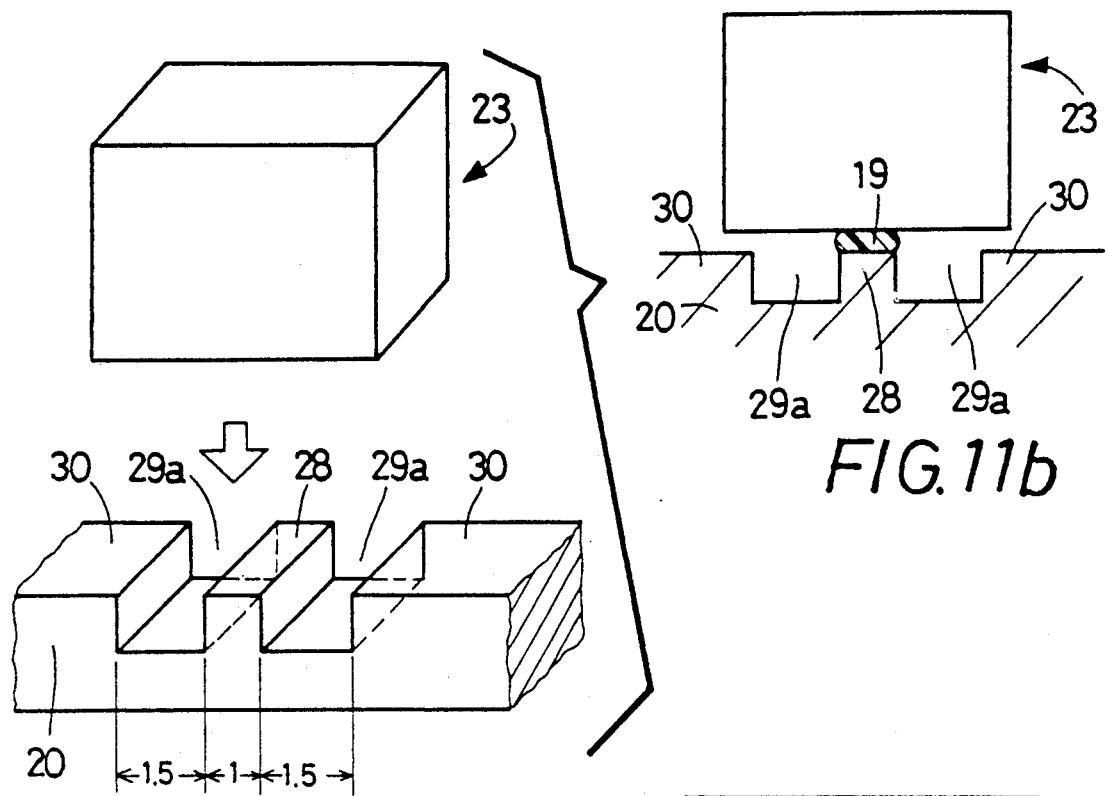
FIG.11b
FIG.11a
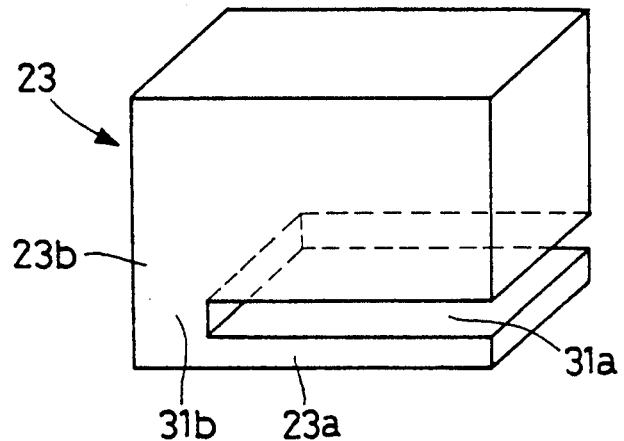
FIG.12a
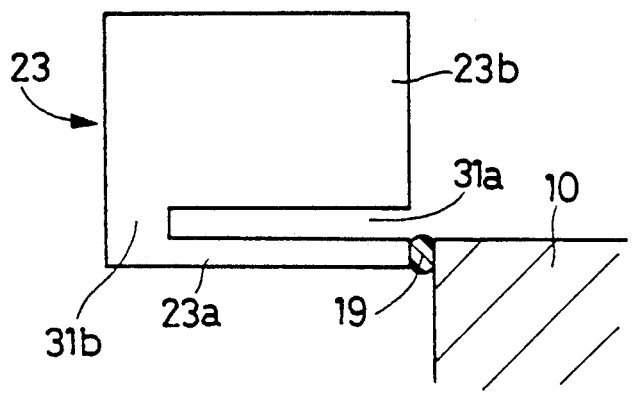
FIG.12b

OPTICAL UNIT INCLUDING A SUBSTRATE AND OPTICAL ELEMENT SUPPORTED ON THE SUBSTRATE SUCH THAT THERMAL STRESSES ARE PREVENTED FROM BEING EXERTED ON THE OPTICAL ELEMENT

This is a continuation of application Ser. No. 07/159,735 filed Feb. 24, 1988, now abandoned.

BACKGROUND OF THE INVENTION

1. Field of the Invention

The present invention relates to an optical unit or package, and more particularly to an optical unit or package which includes a substrate, and at least one optical element or part, such as electrooptical or Pockel's elements, magnetooptical or Faraday elements, and lenses, which is fixedly supported on the substrate.

2. Discussion of the Prior Art

Generally, optical elements or components such as electrooptical or magnetooptical elements and lenses are secured on a suitable support member or substrate by a suitable fixing means such as synthetic resin adhesives or screws, so that the optical elements may serve their function in the appropriate fields of application. Such a known method or structure for supporting the optical elements suffers from strain, deformation of the optical elements, or variation in their refractive index, due to stresses which may arise from a difference in the thermal expansion coefficient between the optical elements and the substrate, which are inevitably subject to varying ambient temperature. When the optical elements are electrooptical or Pockel's elements or magnetooptical or Faraday elements, the thermal stresses indicated above entail significant changes in the optical properties of the elements. When the optical elements are bonded to the substrate with an adhesive, the properties of the optical elements may be changed due to stresses caused by contraction of the adhesive during bonding of the elements to the substrate.

An example of an optical sensor using a conventional optical unit or package is shown in FIG. 1. The optical sensor, which includes the optical unit, further includes a light source 1 for producing a light beam incident upon the optical unit, and a light receiving element or photo-detector 7 adapted to receive an optical output of the optical unit in question. The optical unit includes an optical fiber 2, an electrooptical crystal 3, a polarizer 4a, an analyzer 4b, a quarter waveplate ($\lambda/4$ plate) 5 and rod lenses 6. Reference numeral 8 designates a pair of light-transparent electrodes disposed on both sides of the faces of the electrooptical crystal 3. The optical elements 3, 4a, 4b, 5 and 6 are bonded to one of opposite major surfaces of a substrate 10 by a suitable synthetic resin adhesive indicated at 9 in FIG. 1, whereby the optical elements are fixedly supported as a unit by the substrate 10.

As is well known in the art, an optical sensor is operated utilizing the electrooptical or Pockel's effect, or the magnetooptical or Faraday effect. The electrooptical or magnetooptical effect is defined as a phenomenon wherein optical properties of a transparent crystal are changed when the crystal is placed in an applied electric or magnetic field. In the optical sensor of FIG. 1, wherein a single crystal of lithium niobate ($LiNbO_3$) or $Bi_{12}SiO_{20}$ is used as the electrooptical crystal (Pockel's element) 3, the light beam produced by the light source 1 is linearly polarized by the polarizer 4a, and the linearly polarized light is elliptically polarized by the electrooptical crystal 3. The elliptically polarized light is passed through the quarter waveplate 5 and the analyzer 4b, and is received by the light detector 7 via the rod lens 6. The quantity of the light beam or optical power emitted from the optical unit is determined by the ellipticity of the elliptically polarized light emitted from the electrooptical crystal 3. Namely, the quantity of the elliptically polarized light received by the photo-detector 7 is changed as a function of a voltage applied across the electrooptical crystal 3 via the electrodes 8. Therefore, the voltage applied to the crystal 3 can be determined by measuring the quantity of the elliptically polarized light, i.e., the output of the optical unit of the optical sensor. In the thus constructed optical sensor, however, the output of the optical unit tends to be changed due to a variation in the ambient temperature and a consequent variation in the optical properties of the electrooptical crystal 3 bonded to the substrate 10.

In other types of optical units or packages using a magnetooptical or Faraday crystal, prism lens, reflector or any optical element other than an electrooptical element as discussed above, the optical element suffers from strain or deformation due to stresses arising from a difference in the coefficient of thermal expansion between the optical element, and a substrate made of a ceramic or metal material, for example, on which the optical element is secured or bonded. That is, a change in the ambient temperature of the optical sensor may cause a variation in the optical properties of the optical element, and a change in the direction of propagation of a light beam through the optical element. Further, repeated changes in the ambient temperature may even cause a fatigue of the bond between the optical element and the substrate, eventually resulting in a failure or fracture of the bond.

SUMMARY OF THE INVENTION

It is accordingly an object of the present invention to provide an optical unit having a substrate and at least one optical element fixedly supported on the substrate. The optical unit is protected from an undesirable variation in the optical properties of the optical element or elements, caused by thermal stresses exerted at the varying ambient temperature to the optical unit, due to a difference in the thermal expansion coefficient between the optical element or elements and the substrate.

Another object of the invention is to provide an optical unit as used in an optical sensor, which assures improved operating stability or output characteristics, without being influenced by a change in the ambient temperature.

The above objects can be achieved according to the principle of the present invention, which provides an optical unit comprising a substrate, at least one optical element fixedly supported by the substrate, and protecting means associated with the substrate and each optical element, for protecting the above-indicated optical element from thermal stresses exerted thereto due to a difference in thermal expansion coefficient between the substrate and the above-indicated each optical element.

The optical element or elements fixedly supported by the substrate in the optical unit according to the invention include not only the previously discussed electrooptical elements having the Pockel's effect, or magnetooptical elements having the Faraday effect, but also prism lenses and optical reflectors, and further include polarizers, analyzers, quarter ($\lambda/4$) wave plates, and rod lenses, which are indicated in FIG. 1 at 4a, 4b, 5 and 6, respectively. The present invention is particularly effective in solving the problems otherwise encountered with such optical elements which are considerably susceptible to thermal stresses due to differences in thermal expansion coefficient with respect to the substrate, to which the optical elements are secured.

The optical element may consist of an electrooptical crystal such as $LiNbO_3$ (lithium niobate), $LiTaO_3$ (lithium tantalate), $Bi_{12}SiO_{20}$, or $Bi_{12}GeO_{20}$, or a magnetooptical crystal such as YIG, lead glass, or ZnSe. The principle of the present invention is suitably practiced for fixing on the substrate these electrooptical or magnetooptical crystals, in particular, electrooptical crystals.

The substrate for supporting the optical elements may be formed of a material selected from among various known materials, such as ceramics and metals.

The present invention is applied to at least one of the one or more optical elements fixedly carried or supported on the substrate.

In one form of the present invention, the protecting means for protecting the optical element from thermal stresses exerted thereto consists of at least one intermediate body interposed between the substrate, and each optical element to which the invention applies. Each intermediate body has a thermal expansion coefficient close to that of the relevant optical element, generally, intermediate between those of the optical element and the substrate. The intermediate body may be formed of a suitable material such as ceramics, plastics and metals. Further, the intermediate body for an optical crystal may be made of the same material as the crystal.

It will be apparent from the following description and examples that the intermediate body or bodies interposed between the optical element and the substrate is/are effective to mitigate or relax thermal stresses which would occur due to a difference in the thermal expansion coefficient between the optical element and the substrate of the optical unit which is subject to a considerable variation in the ambient temperature. Accordingly, the optical properties of the instant optical unit are less likely to be changed, whereby an output fluctuation of an optical sensor using the instant optical unit is significantly reduced.

The intermediate body interposed between the optical element and the substrate generally takes the form of a plate having a suitable thickness that is preferably greater than that of an adhesive layer (indicated at 9 in FIG. 2). Usually, the thickness of the intermediate body falls within a range between 100 microns and 10 millimeters.

Each intermediate body is interposed between the appropriate optical element and the substrate, such that the intermediate body is secured, for example, bonded, to the optical element and the substrate. Where two or more intermediate bodies are interposed between the optical element and the substrate, the intermediate bodies are also secured to each other, as with an adhesive. The use of at least one intermediate body having a suitably selected intermediate thermal expansion coefficient permits effective mitigation or relaxation of thermal stresses which may occur due to a difference in the thermal expansion coefficient between the optical element and the substrate. Thus, the intermediate body or bodies may eliminate adverse influences of the thermal stresses on the appropriate optical element.

Preferably, the thermal expansion coefficient of the intermediate body used according to the invention is determined so as to satisfy the following relationship:

$$|\alpha 1 - \alpha 3| < |\alpha 1 - \alpha 2|$$

where, $\alpha 1$: thermal expansion coefficient of the optical element $\alpha 2$: thermal expansion coefficient of the substrate $\alpha 3$: thermal expansion coefficient of the intermediate body.

The object of the present invention may be more effectively achieved when the thermal expansion coefficient of the intermediate body falls within the range indicated above.

When two or more intermediate bodies are interposed between the optical element and the substrate, it is preferred that the thermal expansion coefficients of these intermediate bodies vary in steps in the direction from the substrate toward the optical element, such that the thermal expansion coefficient of the intermediate body located nearest to the optical element is of a value which is nearest to that of the optical element. In this case, the thermal stresses between the optical element and the substrate can be mitigated stepwise.

While the intermediate body or bodies is/are generally secured to the optical element and the substrate by adhesive layers of a suitable resin material, these members may be fixed to each other by other means such as screws and welds, as long as the members constitute an integral unitary body.

In another form of the invention, the protecting means for protecting the optical element from thermal stresses exerted thereto consists of a constricted protecting portion formed on one of the optical elements and the substrate, such that the protecting portion defines an adjoining interface between the optical element and the substrate, or is located adjacent to the adjoining interface. The protective portion of the optical element or the substrate effectively reduces or mitigates adverse effects of the thermal stresses which are exerted on the optical element, due to the difference in the thermal expansion coefficient between the optical element and the substrate. Thus, the instant form of the invention also assures consistent optical properties and output characteristics of the optical unit, regardless of the varying ambient temperature. In this case, too, the optical element and the substrate are secured to each other by a suitable method, such as bonding with an adhesive, screwing, or welding.

The constricted protecting portion may consist of a protrusion formed on the associated optical element. This protrusion has an adjoining surface at which the optical element is fixedly supported by the substrate. The protrusion is located at a substantially middle part of the optical element, as viewed in a direction parallel to the adjoining surface. In this case, the protrusion may be defined by at least two grooves formed in the optical element.

Alternatively, the constricted protecting portion may consist of a constricted portion of the associated optical element which is defined by a pair of slots formed adjacent to the adjoining interface, such that the constricted portion is left between the pair of slots, at a substantially middle part of the optical element, as viewed in a direction parallel to the slots.

Further, the constricted protecting portion may consist of a constricted portion of the associated optical element which is defined by a slot formed adjacent to the adjoining interface, such that the constricted portion is left at one end of the slot as viewed in a direction parallel to the adjoining interface.

In another alternative the constricted protecting portion may consist of a protrusion formed on the substrate, the protrusion having an adjoining surface at which the optical element is fixedly supported by the substrate. The protrusion is aligned at a substantially middle part of the optical element, as viewed in a direction parallel to the adjoining surface. In this instance, the protrusion may be defined by at least two grooves formed in the substrate.

As a still further alternative, the constricted protecting portion may consist of a constricted portion of the substrate which is defined by at least one slot formed adjacent to the adjoining interface, such that at least one slot and the constricted portion cooperate to define an adjoining portion of the substrate at which the substrate supports each optical element, the constricted portion supporting the adjoining portion.

BRIEF DESCRIPTION OF THE DRAWINGS

The above and other objects, features and advantages of the present invention will become more apparent by reading the following detailed description of presently preferred examples of the invention, when considered in connection with the accompanying drawings, in which:

FIGS. 11(a) and 11(b) are views corresponding to those of FIGS. 10(a) and 10(b), respectively, showing another form of the protecting portion provided on the substrate according to the invention;

FIGS. 12(a) and 12(b) are views corresponding to those of FIGS. 7(a) and 7(b), showing a still further form of the protecting portion provided on the optical element;

DETAILED DESCRIPTION OF THE INVENTION

To further clarify the concept of the present invention, a considerable number of presently preferred examples of the invention will be described by reference to the drawings. It is to be understood that the invention is not limited to the illustrated examples, but may be embodied with various changes, modifications and improvements, which may occur to those skilled in the art, without departing from the spirit and scope of the invention defined in the appended claims.

EXAMPLE 1

Figure 1:
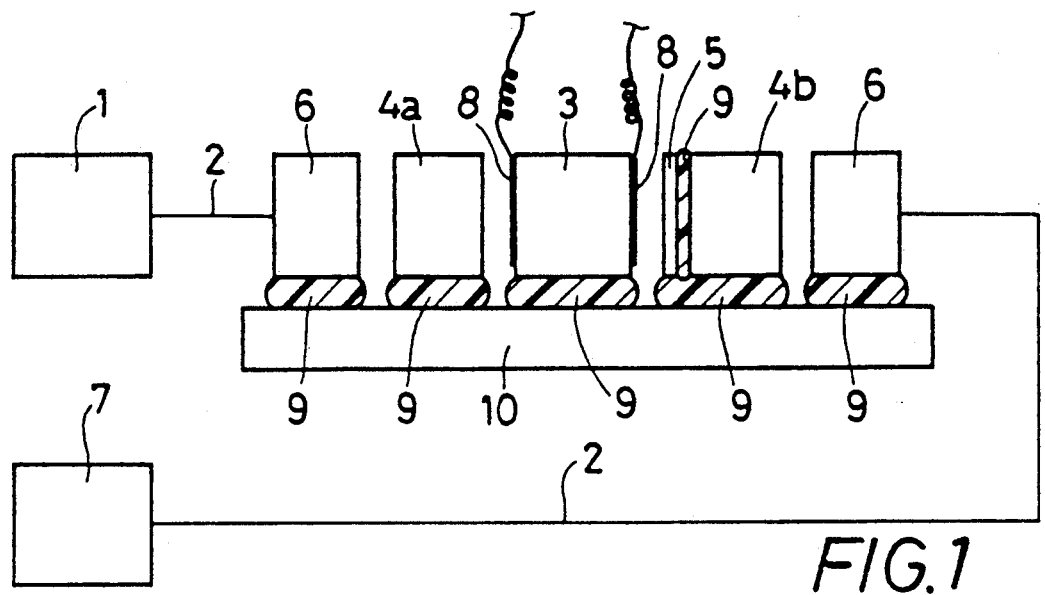
FIG. 1 is a schematic view of an optical sensor incorporating a known optical unit prepared as a comparative example.

The optical sensor of FIG. 1 was prepared, as previously described, as a comparative example. A $Bi_{12}SiO_{20}$ single crystal having dimensions of 4.7 mm × 7 mm × 5.1 mm was used as the electrooptical crystal 3 of the optical unit of a light-transmitting type. The electrodes 8 were attached to both sides of the 7 mm × 5.1 mm faces of the crystal 3 which are normal to the direction of propagation of the light beam (i.e., normal to the optical axis of the sensor). Measurement of the thermal expansion coefficient of crystal 3 was found to be $150 \times 10, -7/°$ C. As substrate 10 supporting this electrooptical crystal 3, a $CaTiO_3$ polycrystal having a thermal expansion coefficient of $112 \times 10^{-7}/°$ C. was used. The other elements, i.e., rod lenses 6, polarizer 4a, analyzer 4b, and quarter wave plate 5 were arranged as shown in FIG. 1. All the elements were bonded to the surface of the substrate 10 by adhesive layers 9 of an epoxy resin. Thus, an optical unit of the light-transmitting type of optical sensor of FIG. 1 was prepared. The quarter wave plate 5, which has a considerably small thickness, was first bonded to the analyzer 4b with an epoxy resin, and then bonded to the substrate 10 together with the analyzer by the epoxy resin adhesive.

To improve the measuring accuracy of the sensor, a circuit was provided for separating the output of the photo-detector 7 into AC and DC components, and electrically dividing the AC component by the DC component.

The prepared optical sensor was placed in a thermostat, and AC50 V, 60 Hz was applied to the electrodes 8 of the electrooptical crystal 3, while the temperature of the sensor was varied between −20° C. and +80° C. A measurement of an output signal fluctuation or variation of the sensor was 3%.

Figure 2:
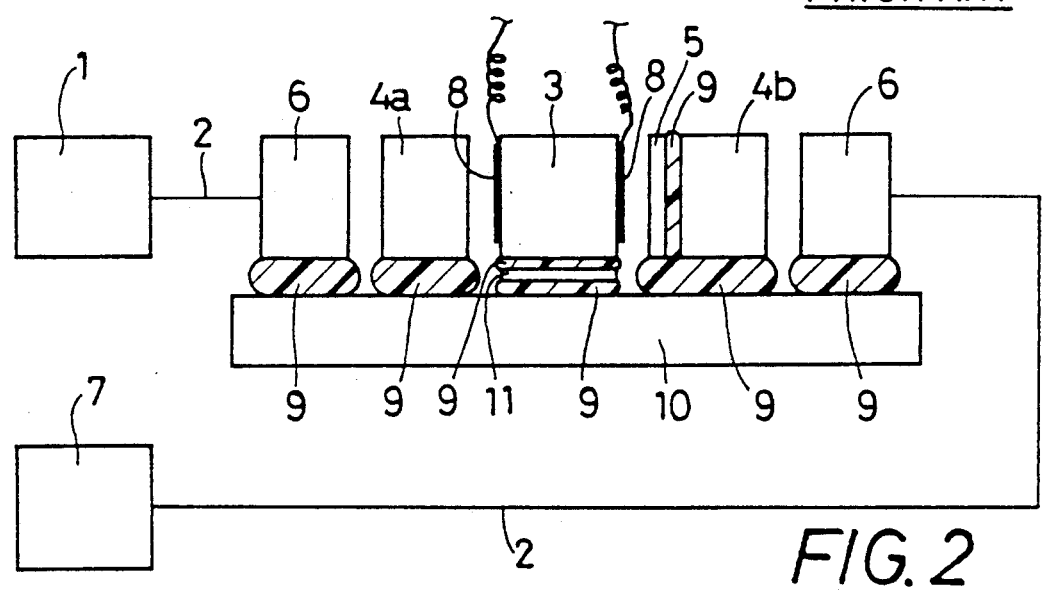
FIG. 2 is a schematic view corresponding to that of FIG. 1, showing an optical sensor incorporating one example of an optical unit prepared according to one aspect of the present invention.

On the other hand, there was prepared an optical sensor as shown in FIG. 2, wherein an intermediate body in the form of a glass plate 11 having a thermal expansion coefficient of $130 \times 10^{-7}/°$ C. is interposed between the $Bi_{12}SiO_{20}$ single crystal 3 and the $CaTiO_3$ substrate 10, such that the interposed glass plate 11 is bonded to the crystal 3 and the substrate 10 by the epoxy resin adhesive layers 9. A measurement of an output fluctuation of this optical sensor under the same conditions as described above was 1%. This means a considerable reduction in the output variation.

EXAMPLE 2

Figure 3:
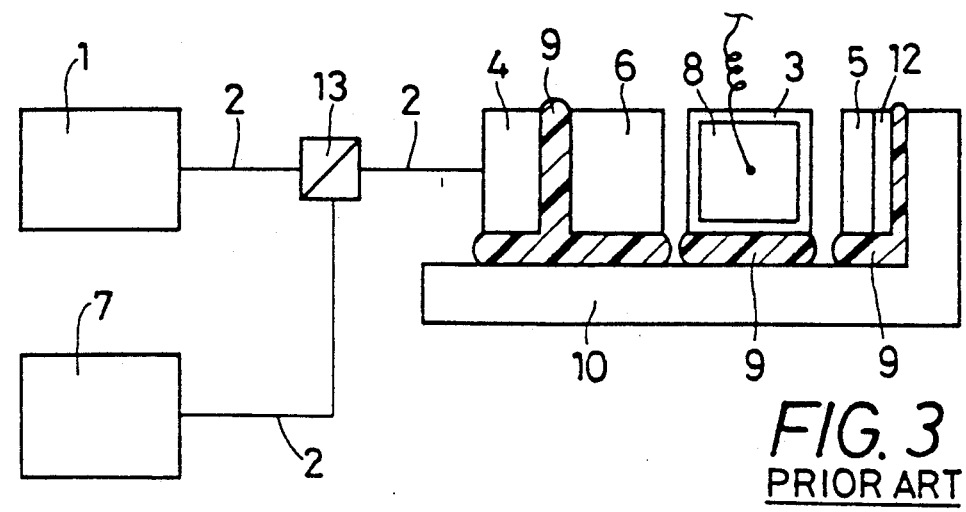
FIG. 3 is a schematic view of an optical sensor incorporating another known optical unit prepared as another comparative example.

As a comparative example, an optical sensor of a light-reflecting type as shown in FIG. 3 was prepared. In this optical sensor, the electrooptical crystal 3 consists of a 2 mm×3 mm×5 mm $LiNbO_3$ single crystal whose Z axis is aligned with the direction of propagation of the light beam, and the electrodes 8 are disposed on both sides of 3 mm×5 mm faces of the crystal 3 which are parallel to the optical axis. As the substrate 10, a $CaTiO_3$ polycrystal was used. Measurements of the thermal expansion coefficient of the $LiNbO_3$ single crystal 3 were $38 \times 10^{-7}/°$ C. in the Z-axis direction, and $167 \times 10^{-7}/°$ C. in the direction perpendicular to the Z-axis direction. The rod lens 6, polarizer 4 which also serves as a analyzer, and quarter wave plate 5 formed with a dielectric multilayer mirror 12 were arranged on the $CaTiO_3$ substrate 10 as shown in FIG. 3. These elements 6, 4, 5 and the $LiNbO_3$ crystal 3 were bonded to the substrate 10 by the epoxy adhesive layers 9. Thus, an optical unit of the light-reflecting type of optical sensor of FIG. 3 was prepared. This light-reflecting type of optical sensor can be made smaller in size than the light-transmitting type, but requires an optical coupler 13 between the light source 1 and the optical unit.

An output fluctuation of the optical sensor of FIG. 3 corresponding to the ambient temperature variation of −20° C. to +80° C. was measured in the same manner as in Example 1. The measurement was 4%.

Figure 4:
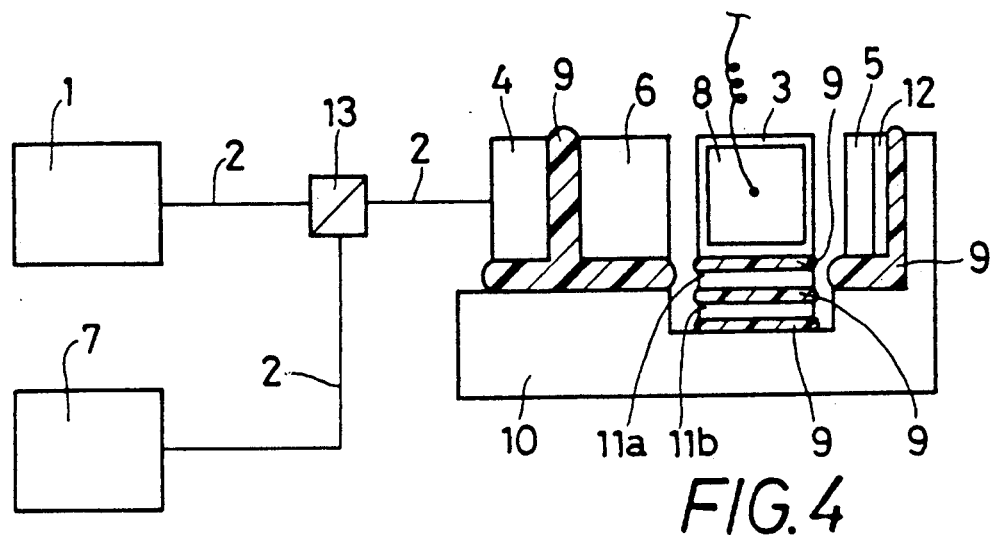
FIG. 4 is a schematic view corresponding to that of FIG. 3, showing an optical sensor incorporating another example of the optical unit prepared according to the invention.

In the meantime, an optical unit of a similar light-reflecting type of optical sensor was prepared as shown in FIG. 4. In this optical unit, two intermediate bodies in the form of glass plates 11a, 11b are interposed between the $LiNbO_3$ single crystal 3 and the $CaTiO_3$ substrate 10, such that the first glass plate 11a is positioned on the side of the crystal 3, while the second plate 11b is positioned on the side of the substrate 10, as indicated in FIG. 4. The thermal expansion coefficients of the first and second glass plates 11a, 11b are $60 \times 10^{-7}/°$ C., and $100 \times 10^{-7}/°$ C., respectively. Each glass plate 11a, 11b has a length (parallel to the Z-axis direction of the optical unit) of 5 mm, a width of 1 mm and a thickness of 0.5 mm. The glass plates 11a, 11b are aligned with a middle part of the 2 mm×5 mm bottom face of the crystal 3, as viewed in the direction of width of the plates. As indicated in FIG. 4, the two glass plates 11a, 11b are bonded to each other and to the crystal 3 and the substrate 10, by the epoxy resin adhesive layers 9.

This optical sensor was also tested under the same conditions as described above, to find an output fluctuation corresponding to the ambient temperature change of −20° C. to +80° C. The measured fluctuation was 0.5%. This considerable reduction in the output fluctuation was considered to be derived from the use of the two intermediate glass plates 11a, 11b interposed between the $LiNbO_3$ crystal 3 and the $CaTiO_3$ substrate 10.

Figure 5:
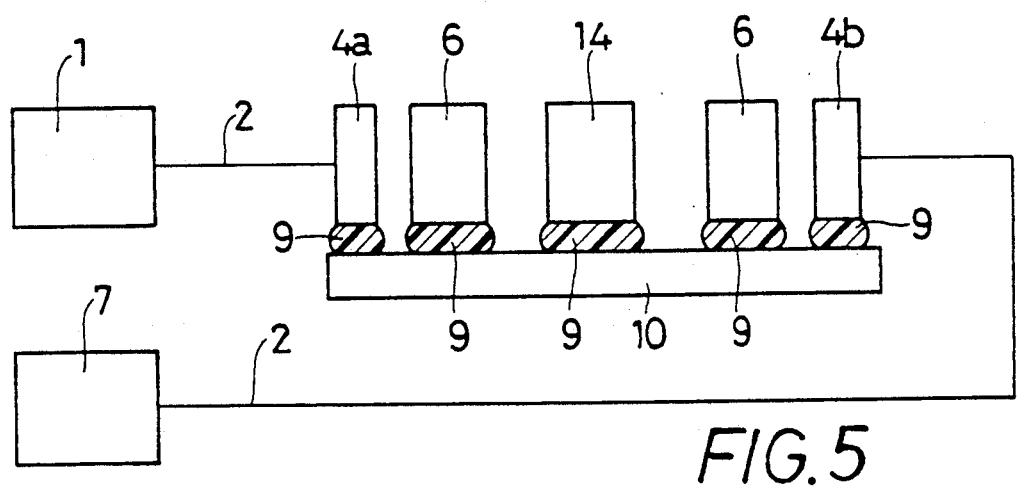
FIG. 5 is a schematic view of an optical sensor incorporating a known optical unit which uses a magnetooptical crystal.
Figure 6:
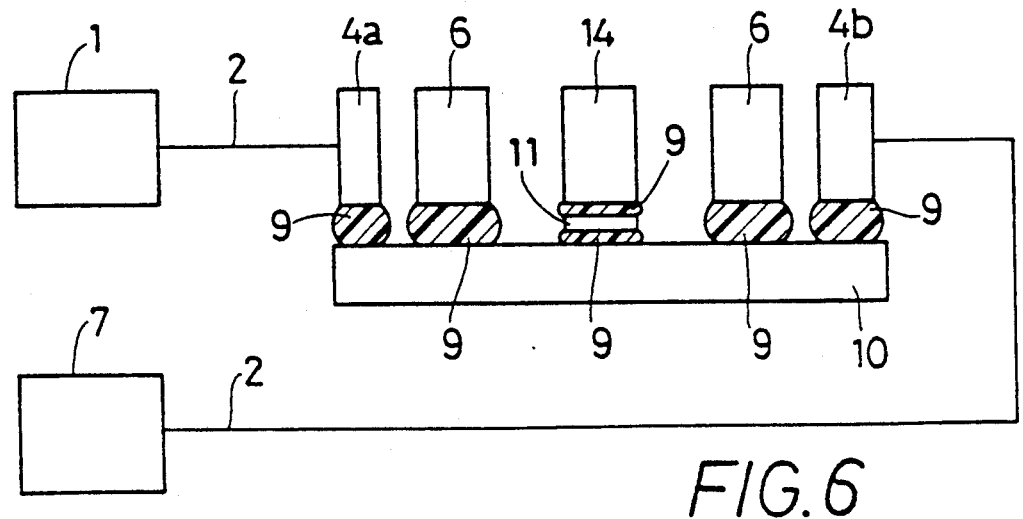
FIG. 6 is a view of the optical sensor of FIG. 5 as modified according to the principle of the present invention.

The principle of the present invention was also applied to an optical unit of FIG. 5 using a YIG crystal 14, which is a magnetooptical element. That is, the optical unit shown in FIG. 5 was modified according to the present invention, into an optical unit shown in FIG. 6 in which an intermediate planar body 11 is interposed between the magnetooptical crystal 14 and the substrate 10. The crystal 14 has dimensions of 3 mm×3 mm×3 mm. The crystal 14 is positioned such that the axis (111) is parallel to the direction of propagation of the light beam.

EXAMPLE 3

As a comparative example, an optical sensor of a light-reflecting type similar to that shown in FIG. 3 (comparative example in Example 2) was prepared. In this optical sensor, however, the electrooptical crystal 3 consists of a 2 mm×4 mm×5 mm $LiNbO_3$ single crystal whose Z axis is aligned with the direction of propagation of the light beam, and the electrodes 8 are disposed on both sides of 4 mm×5 mm faces of the crystal 3 which are parallel to the optical axis. The substrate 10 is a $CaTiO_3$ polycrystal as used in Example 2. Measurements of the thermal expansion coefficient of the $LiNbO_3$ single crystal 3 were $38 \times 10^{-7}/°$ C. in the Z-axis direction, and $167 \times 10^{-7}/°$ C. in the direction perpendicular to the Z-axis direction. The rod lens 6, polarizer 4, and quarter wave plate 5, formed with the multilayer mirror 12, were arranged on the $CaTiO_3$ substrate 10 and bonded to the same, as shown in FIG. 3. Thus, an optical unit of the light-reflecting type of optical sensor similar to that shown in FIG. 3 was prepared. To improve the measuring accuracy of the sensor, the output of the photo-detector 7 was separated into AC and DC components, and the AC component was electrically divided by the DC component, as described with respect to Example 1.

The prepared optical sensor was placed in a thermostat, and AC 50 V, 60 Hz was applied to the electrooptical crystal 3, while the temperature of the sensor was varied between −20° C. and +80° C. A measurement of an output signal fluctuation of the sensor was 4%.

Figure 7A:
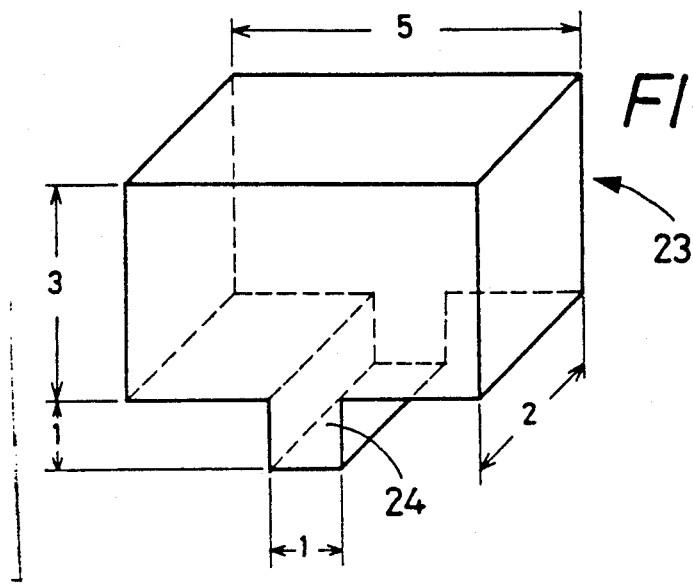
FIG. 7(a) is a perspective view of an optical element having one form of a protecting portion provided on an optical element according to another aspect of the present invention.
Figure 7B:
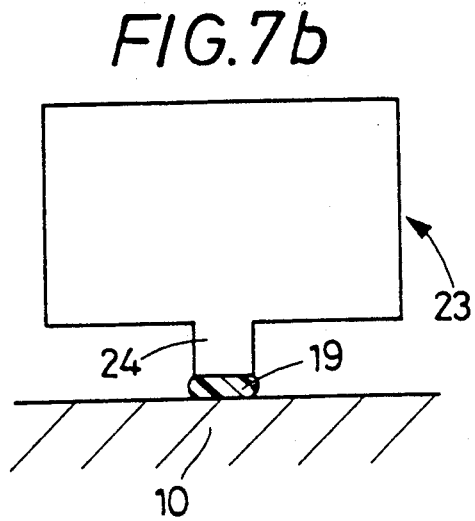
FIG. 7(b) is a schematic elevational view of the optical element of FIG. 7(a) and a substrate supporting the element.

On the other hand, an optical was prepared as shown in FIG. 7(a), which uses a $LiNbO_3$ single crystal 23 which has a constricted portion in the form of a rectangular protrusion 24 having dimensions as indicated in the figure (expressed in millimeters. This protrusion 24 protrudes from a central part of the bottom face of the crystal 23, and has a 1 mm×2 mm bottom surface at which the crystal 23 and the $CaTiO_3$ substrate 10 adjoin via a resin adhesive layer 19, as shown in FIG. 7(b). Namely, the rectangular projection 24 provides an adjoining interface between the crystal 23 and the substrate 10. An output fluctuation test was conducted on the instant optical sensor under the same conditions described above. The test showed an output fluctuation of 0.7%, which is considerably reduced with respect to the comparative example.

Figure 8A:
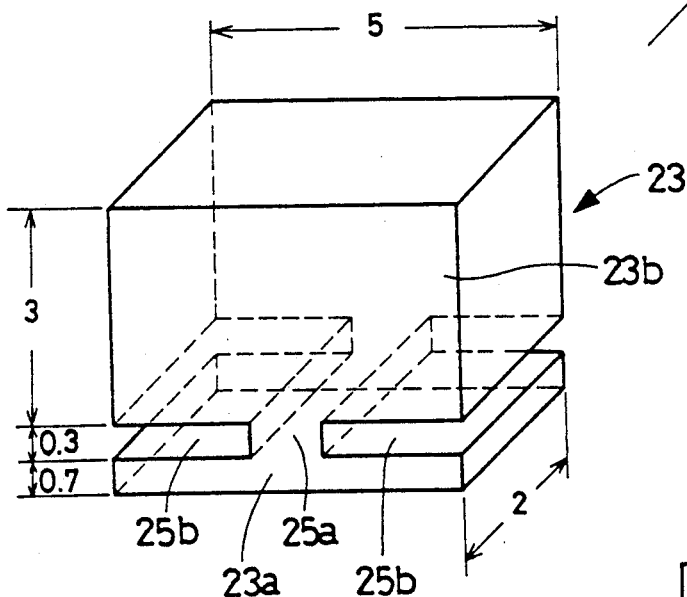
FIGS. 8(a) and 8(b) are views corresponding to those of FIGS. 7(a) and 7(b), respectively, showing an optical element having another form of the protecting portion.
Figure 8B:
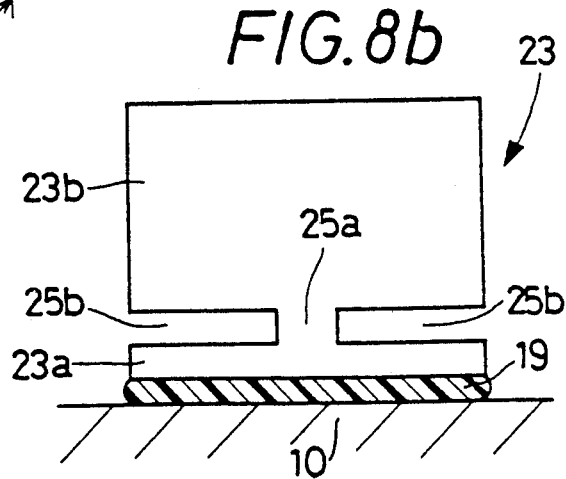

An output fluctuation test was also conducted on an optical sensor which includes a $LiNbO_3$ crystal 23 as shown in FIG. 8(a). This crystal 23 has a light-transmitting body portion 23b, a bottom adjoining portion 23a at which the crystal is bonded to the substrate 10 with the adhesive layer 19, and a constricted portion 25a disposed between the body portion 23b and the adjoining portion 23a. The constricted portion 25a is defined by a pair of rectangular slots 25b which are formed symmetrically with each other parallel to the adjoining surface of the adjoining portion 23b, so that the constricted portion 25a is left between the slots 25b, in the middle of the crystal 23 as viewed in the direction parallel to the slots 25b. The slots 25b have dimensions as indicated in FIG. 8(a), so that the crystal 23 has a generally H-shaped bottom portion which includes the adjoining portion 23a and the constricted portion 25a. Thus, the constricted portion 25a is located adjacent to the adjoining portion 23a, which has a larger adjoining surface than the bottom surface of the constricted portion 24 of FIG. 7(a). The adjoining portion 23a therefore assures a comparatively large bonding strength between the crystal 23 and the substrate 10. The test conducted on the sensor using this crystal 23 under the same conditions as described above showed an ouput fluctuation of as small as 0.5%.

Figure 9A:
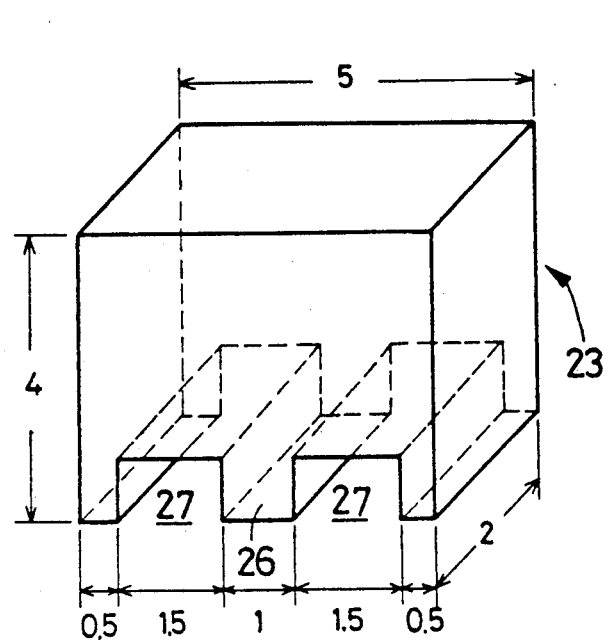
FIGS. 9(a) and 9(b) are views also corresponding to those of FIGS. 7(a) and 7(b), showing an optical element having a further form of the protecting portion.
Figure 9B:
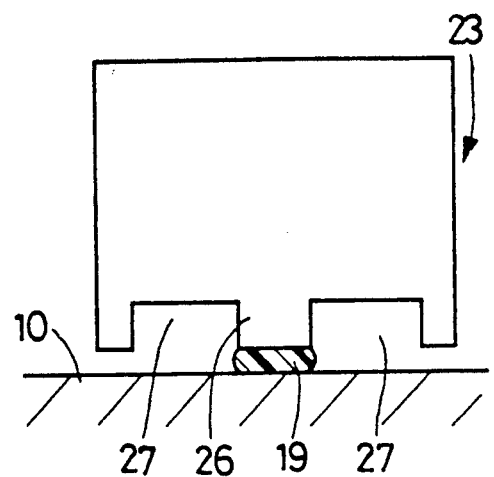

A test was conducted further on an optical sensor which uses a LiNbO$_3$ crystal 23 as shown in FIG. 9(a). This crystal 23 has a constricted portion in the form of a rectangular protrusion 26 defined by and between two parallel rectangular grooves, 27 formed in the bottom face, such that the rectangular protrusion 26 is left in the middle of the bottom face of the crystal 23, as viewed in the direction perpendicular to the grooves 27. The grooves 27 have dimensions as indicated in FIG. 9(a). The crystal 23 is bonded at the bottom surface of the rectangular protrusion 26, to the substrate 10 by the adhesive layer 19, as shown in FIG. 9(b). Thus, the rectangular protrusion 26 defines an adjoining interface between the crystal 23 and the substrate 10. The output fluctuation test conducted on the optical sensor using this crystal 23 revealed an output fluctuation of 0.8%.

EXAMPLE 4

As a comparative example, an optical sensor of a light-reflecting type similar to that shown in FIG. 3 (comparative example in Example 2) was prepared. In this optical sensor, however, the electrooptical crystal 3 consists of a 2 mm × 4 mm × 5 mm LiNbO$_3$ single crystal whose Z axis is aligned with the direction of propagation of the light beam, and the electrodes 8 are disposed on opposite 4 mm × 5 mm faces of the crystal 3 which are parallel to the optical axis. The substrate 10 is a CaTiO$_3$ polycrystal as used in Example 2. Measurements of the thermal expansion coefficient of the LiNbO$_3$ single crystal 3 were $38 \times 10^{-7}/°$ C. in the Z-axis direction, and $167 \times 10^{-7}/°$ C. in the direction perpendicular to the Z-axis direction. The rod lens 6, polarizer 4, and quarter wave plate 5 formed with the multilayer mirror 12 were arranged on the CaTiO$_3$ substrate 10 and bonded to the same, as shown in FIG. 3. Thus, an optical unit of the light-reflecting type of optical sensor similar to that shown in FIG. 3 was prepared. To improve the measuring accuracy of the sensor, the output of the photo-detector 7 was separated into AC and DC components, and the AC component was electrically divided by the DC component, as described with respect to Example 1.

The prepared optical sensor was placed in a thermostat, and AC 50 V, 60 Hz was applied to the electrooptical crystal 3, while the temperature of the sensor was varied between $-20°$ C. and $+80°$ C. A measurement of an output signal fluctuation of the sensor was 4%.

Figure 10B:
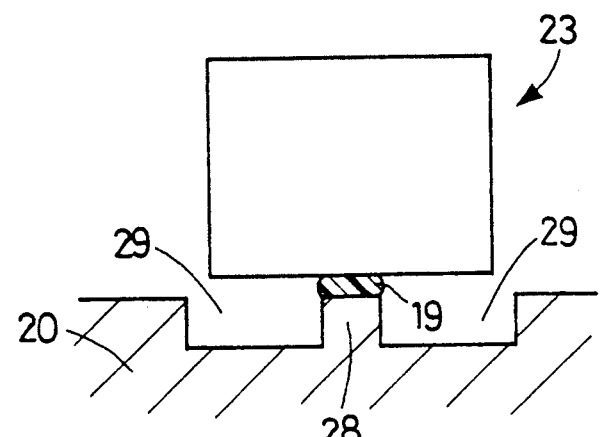
FIG. 10(b) is a schamatic elevational view of the optical element and the substrate of FIGS. 10(a)
Figure 10A:
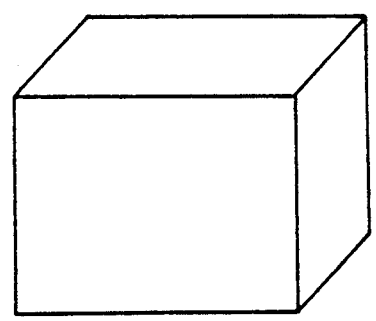
FIG. 10(a) is a perspective view of an optical element, and a substrate having a still further form of the protecting portion according to the invention.
Figure 10A:
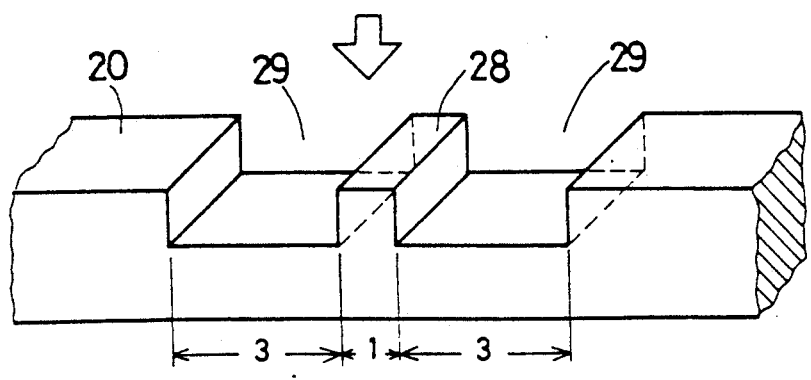

In the meantime, an optical sensor was prepared as shown in FIG. 10(a), which uses a CaTiO$_3$ polycrystal substrate 20 which has a constricted portion in the form of a rectangular protrusion 28 defined by and between two parallel rectangular grooves, 29 formed in the upper surface of the substrate 20, such that the rectangular protrusion 28 is left in a central part of the substrate 20. The grooves 29 have dimensions as indicated in FIG. 10(a). The crystal 23 is bonded to the upper surface of the substrate 20 by the adhesive layer 19, as shown in FIG. 10(b). Thus, the rectangular protrusion 28 defines an adjoining interface between the crystal 23 and the substrate 20. An output fluctuation test was conducted on the sensor using the substrate 20 under the same conditions as previously described. The test revealed an output fluctuation of 0.9%. This indicates a significant reduction in the output fluctuation in the instant optical sensor.

A test was conducted on an optical sensor using a modified form of the CaTiO$_3$ substrate 20 as shown in FIG. 11(a), which has parallel rectangular grooves 29a, defining the rectangular protrusion 28 therebetween. These rectangular grooves 29a have a width [indicated in FIG. 11(a)] which is smaller than that of the grooves 29 of FIGS. 10(a) and 10(b), so that the LiNbO$_3$ crystal 23 may be supported also by upper surfaces of two parallel edges 30, each of which defines one of opposite sides of the corresponding groove 29a, remote from the protrusion 28. A test conducted on the optical sensor using the thus constructed substrate 20 revealed an output fluctuation of 0.7%.

EXAMPLE 5

Other optical sensors were prepared by using other modified forms of the LiNbO$_3$ single crystal 23 or CaTiO$_3$ polycrystal substrate 20, as shown in FIGS. 12(a) and 12(b) through FIGS. 15(a) and 15(b). In each of these sensors, the LiNbO$_3$ crystal 23 or the substrate 20 has a constricted portion which defines an adjoining interface between the crystal 23 and the substrate 20, or which is located adjacent to the adjoining surface. The crystal 23 and the substrate 20 are bonded to each other by the resin adhesive layer 19.

Figure 14A:
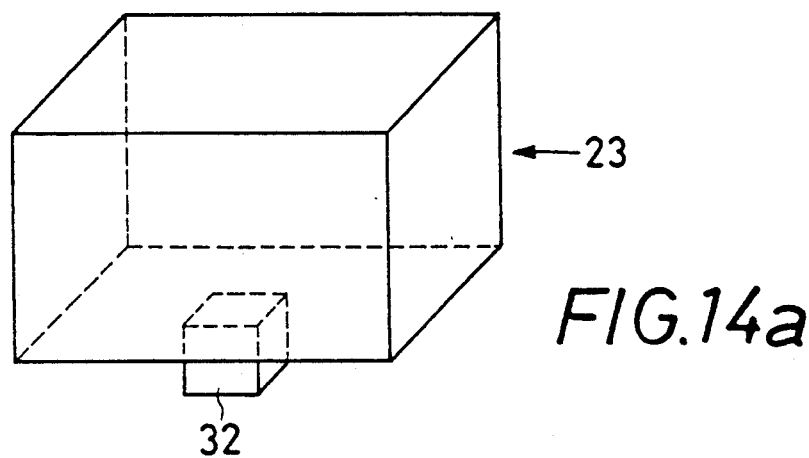
FIGS. 14(a) and 14(b) are views also corresponding to those of FIGS. 7(a) and 7(b), respectively, showing a yet further form of the protecting portion provided on the optical element.
Figure 14B:
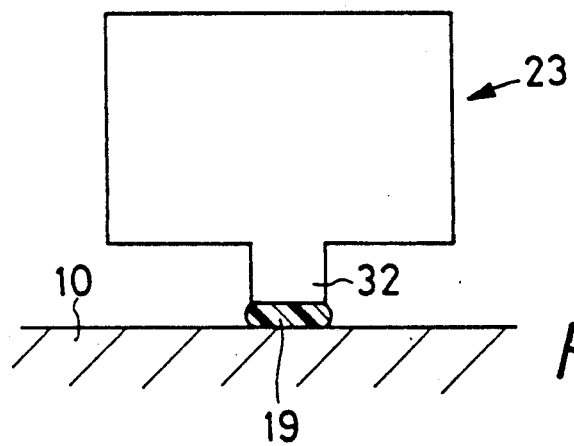

Described more specifically, the optical elements or LiNbO$_3$ crystals 23 shown in FIGS. 12(a), 12(b) and FIGS. 14(a), 14(b) are processed to provide a constricted portion. Namely, the crystal 23 of FIGS. 12(a) and 12(b) has a rectangular slot 31a formed parallel to its adjoining portion 23a, between the adjoining portion 23a and its light-transmitting body portion 23b, so that a constricted portion 31b connecting the adjoining and body portions 23a, 23b is provided at one end of the slot 31a. In this case, the crystal 23 is bonded by the adhesive layer 19 to the substrate 10 at one end of the adjoining portion 23a, remote from the constricted portion 31b, as illustrated in FIG. 12(b). The crystal 23 shown in FIG. 14(a) has a rectangular protrusion 32 protruding from a central part of its bottom face. This protrusion 32 defines an adjoining interface with respect to the substrate 10, to which the crystal 23 is bonded by the adhesive layer 19 as shown in FIG. 14(b).

Figure 13:
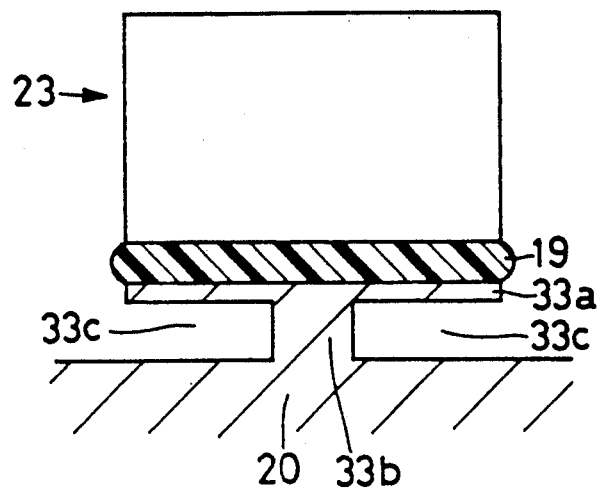
FIG. 13 is a schematic elevational view showing a further form of the protecting portion provided on the substrate.
Figure 15A:
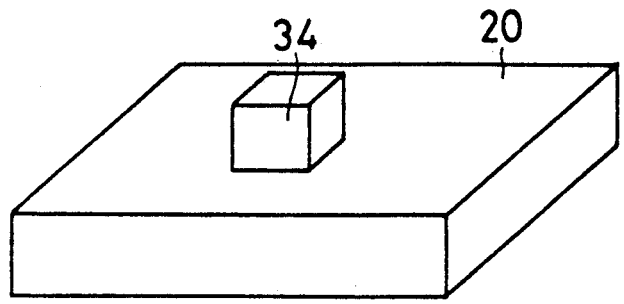
FIGS. 15(a) and 15(b) are views corresponding to those of FIGS. 10(a) and 10(b), showing another form of the protecting portion provided on the substrate.
Figure 15B:
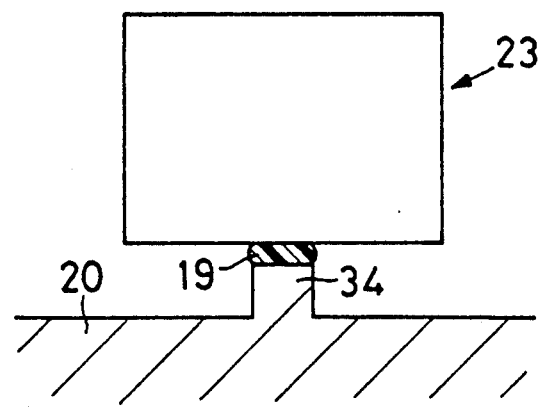

In the optical sensors shown in FIGS. 13 and 15(a), 15(b), on the other hand, the substrates 20 are processed to provide a constricted portion. That is, the substrate 20 of FIG. 13 has an adjoining portion 33a, supported by a constricted portion 33b. The constricted portion 33b is defined by a pair of rectangular slots 33c formed parallel to the adjoining portion 33a, so that the constricting portion 33b is left between the two slots. The crystal 23 is bonded to the adjoining portion 33a of the substrate 20, by the adhesive layer 19. The substrate 20 shown in FIG. 15(a), has a rectangular protrusion 34 formed on its upper surface, so that the protrusion 34 provides an adjoining surface to which the crystal 23 is bonded by the adhesive layer 19, as shown in FIG. 15(b).

Figure 16A:
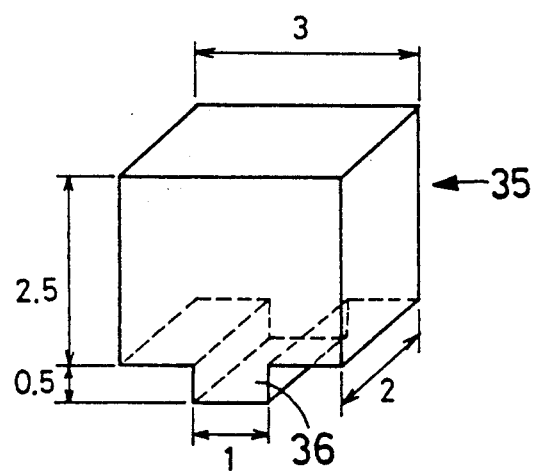
FIGS. 16(a) is a perspective view of a magnetooptical crystal which has a protecting portion according to the invention.
Figure 16B:
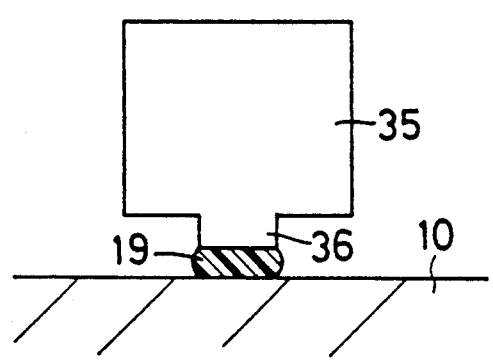
FIG. 16(b) is a schematic elevational view showing the magnetooptical crystal of FIG. 16(a) and a substrate supporting the crystal.

While the various forms of constricted portions or protrusions as means for protecting an electrooptical element (LiNbO$_3$ 23) from thermal stresses have been described by reference to FIGS. 7(a), 7(b) through FIG. 15(a), 15(b), it is possible that similar protecting means may be provided for a magnetooptical element (e.g., YIG crystal 14 as shown in FIG. 5) used in a magnetooptical sensor as shown in FIG. 5. For example, a YIG crystal 35 having a protrusion 36 as shown in FIGS. 16(a) and 16(b) may be used in place of the YIG crystal 14 of FIG. 5.

What is claimed is:

1. An optical unit, comprising:
   a substrate;
   at least one optical element; and
   a constricted portion consisting of a single protrusion interposed between said substrate and each said optical element, said constricted portion fixedly supporting each said optical element to said substrate during use of said optical element, for protecting each said optical element from thermal stresses exerted thereto due to a difference in thermal expansion coefficient between said substrate and each said optical element, to thereby prevent a variation in optical properties of each said optical element due to said thermal stresses;
   wherein said protrusion has a bonding surface which is parallel to a plane of said substrate at which said substrate is bonded to a bonding surface of each said optical element.

2. The optical unit of claim 1, wherein said constricted protecting portion consists of a protrusion defined by at least two grooves formed in said substrate, said protrusion having an adjoining surface at which each said optical element is fixedly supported by said substrate, said protrusion being aligned at a substantially middle part of each said optical element, as viewed in a direction parallel to said adjoining surface.

3. The optical unit of claim 1, wherein said constricted protecting portion consists of a constricted portion of said substrate which is defined by at least one slot formed adjacent said adjoining interface, such that said slot and said constricted portion cooperate to define an adjoining portion of said substrate at which said substrate supports each said optical element, said constricted portion supporting said adjoining portion.

4. The optical-unit of claim 1, wherein each said optical element consists of an electrooptical or magnetooptical element.

5. An optical unit comprising:
   a substrate;
   at least one optical element which is fixedly supported by said substrate and through which a light beam is transmitted; and
   a plurality of intermediate bodies interposed between said substrate and each said optical element;
   wherein said intermediate bodies have different thermal expansion coefficients close to that of each said optical element, for protecting each said optical element from thermal stresses exerted thereto due to a difference in thermal expansion coefficient between said substrate and each said optical element, to thereby prevent a variation in optical properties of each said optical element due to said thermal stresses, said different thermal expansion coefficients varying in steps in a direction from said substrate toward each said optical element, such that the thermal expansion coefficient of the intermediate body located nearest to each said optical element is closest to that of each said optical element.

6. An optical unit comprising:
   a substrate;
   at least one optical element fixedly supported by said substrate; and
   a single constricted protecting portion for protecting each said optical element from thermal stresses exerted thereto due to a difference in thermal expansion coefficient between said substrate and each said optical element, to thereby prevent a variation in optical properties of each said optical element due to said thermal stresses, said constricted protecting portion defining an adjoining interface between each said optical element and said substrate or being located adjacent said adjoining interface;
   wherein said constricted protecting portion consists of a constricted portion of each said optical element which is defined by a slot adjacent said adjoining interface, such that said constricted portion is left at one end of said slot as viewed in a direction parallel to said adjoining interface.

7. An optical unit comprising:
   a substrate;
   at least one optical element fixedly supported by said substrate; and
   a single constricted protecting portion for protecting each said optical element from thermal stresses exerted thereto due to a difference in thermal expansion coefficient between said substrate and each said optical element, to thereby prevent a variation in optical properties of each said optical element due to said thermal stresses, said constricted protecting portion defining an adjoining interface between each said optical element and said substrate or being located adjacent said adjoining interface;
   wherein said constricted protecting portion consists of a protrusion defined by at least two grooves formed in said substrate, said protrusion having an adjoining surface at which each said optical element is fixedly supported by said substrate, said protrusion being aligned at a substantially middle part of each said optical element, as viewed in a direction parallel to said adjoining surface.

8. An optical unit comprising:
   a substrate;
   at least one optical element fixedly supported by said substrate; and
   a single constricted protecting portion for protecting each said optical element from thermal stresses exerted thereto due to a difference in thermal expansion coefficient between said substrate and each said optical element, to thereby prevent a variation in optical properties of each said optical element due to said thermal stresses, said constricted protecting portion defining an adjoining interface between each said optical element and said substrate or being located adjacent said adjoining interface;

wherein said constricted protecting portion consists of a constricted portion of said substrate which is defined by at least one slot formed adjacent said adjoining interface, such that said slot and said constricted portion cooperate to define an adjoining portion of said substrate at which said substrate supports each said optical element, said constricted portion supporting said adjoining portion.

9. An optical unit comprising:

a substrate;

at least one optical element fixedly supported by said substrate including at least one electrooptical or magnetooptical element; and a single constricted protecting portion for protecting each said optical element from thermal stresses exerted thereto due to a difference in thermal expansion coefficient between said substrate and each said optical element, to thereby prevent a variation in optical properties of each said optical element due to said thermal stresses, said constricted protecting portion defining an adjoining interface between each said optical element and said substrate or being located adjacent said adjoining interface;

wherein said constricted protecting portion consists of a protrusion formed on each said optical element, said protrusion having an adjoining surface at which each said optical element is fixedly supported by said substrate, said protrusion being located at a substantially middle part of each said optical element, as viewed in a direction parallel to said adjoining surface.

10. The optical unit of claim 9, further comprising at least one intermediate body interposed between said at least one electrooptical or magnetooptical element and said substrate.

* * * * *